(12) United States Patent
Kimura et al.

(10) Patent No.: US 12,467,772 B2
(45) Date of Patent: Nov. 11, 2025

(54) OPTICAL ENCODER WITH A BEAM-SHAPING ELEMENT

(71) Applicant: MITUTOYO CORPORATION, Kanagawa (JP)

(72) Inventors: Akihide Kimura, Saitama (JP); Kimitoshi Ono, Kanagawa (JP); Keitaro Koyatsu, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 153 days.

(21) Appl. No.: 18/500,545

(22) Filed: Nov. 2, 2023

(65) Prior Publication Data
US 2024/0175729 A1    May 30, 2024

(30) Foreign Application Priority Data
Nov. 24, 2022 (JP) .................................. 2022-187827

(51) Int. Cl.
*G01D 5/38* (2006.01)
*G01D 5/347* (2006.01)

(52) U.S. Cl.
CPC ........... *G01D 5/38* (2013.01); *G01D 5/34715* (2013.01); *G01D 5/3473* (2013.01)

(58) Field of Classification Search
CPC .... G01D 5/38; G01D 5/3473; G01D 5/34715; G01D 5/34707; G01D 5/26
See application file for complete search history.

(56) References Cited

U.S. PATENT DOCUMENTS

| | | | | |
|---|---|---|---|---|
| 5,359,193 A | * | 10/1994 | Nyui | G01D 5/38 250/237 G |
| 2004/0155178 A1 | * | 8/2004 | Ito | G01D 5/34715 250/231.16 |
| 2008/0024797 A1 | | 1/2008 | Otsuka et al. | |
| 2010/0243871 A1 | * | 9/2010 | Hane | G01D 5/38 250/231.1 |
| 2019/0003860 A1 | | 1/2019 | Tobiason et al. | |
| 2021/0172766 A1 | * | 6/2021 | Shih | G01D 5/3473 |

FOREIGN PATENT DOCUMENTS

JP   2008-32530 A   2/2008

* cited by examiner

*Primary Examiner* — Jennifer D Bennett
(74) *Attorney, Agent, or Firm* — Rankin, Hill & Clark LLP

(57) ABSTRACT

An optical encoder includes: a scale having a scale grating; a light source that emits light; and a light-receiving device that receives light that has passed through the scale. The optical encoder also has a shielding plate that shapes the beam shape, which is the shape of the light emitted from the light source. The shielding plate is disposed between the light source and the scale and defines the beam shape such that the shape of a long-length contour portion and the shape of a long-length side section have no correlation with each other. The long-length contour portion is a portion extending in the measurement direction at the contour of the beam shape of the light emitted to the light-receiving device via the scale, and the long-length side section is a section extending in the measurement direction at the contour of the light-receiving device.

6 Claims, 10 Drawing Sheets

OPTICAL ENCODER WITH A BEAM-SHAPING ELEMENT

CROSS-REFERENCE TO RELATED APPLICATION

This non-provisional application claims priority under 35 U.S.C. § 119 (a) from Japanese Patent Application No. 2022-187827, filed on Nov. 24, 2022, the entire contents of which are incorporated herein by reference.

BACKGROUND OF THE INVENTION

Field of the Invention

The present invention relates to an optical encoder for measuring relative displacement between a head and a scale.

Description of the Related Art

Optical encoders that utilize a method for detecting phase changes in interference fringes corresponding to displacement have conventionally been realized (see, for example, Japanese Patent Application No. 2008-32530).

FIG. 8 is a schematic diagram showing an example of the conventional configuration of such optical encoder 100.

As shown in FIG. 8, laser light emitted from a light source 200 is collimated by a collimator lens L0. Thereafter, the light beam is limited in terms of its size and shape by an aperture 300, which is a beam shaping element, inserted in the optical path, and the light beam enters into a scale 400 after undergoing reflection at a mirror M. The light beam that has entered into the scale 400 is branched off into two diffraction light beams, each injected into an index grating 500. The two light beams are re-diffracted and re-directed in the directions, along which the two beams will meet, by means of the index grating 500. Then, interference fringes are formed in the space where the two beams overlap. Light-receiving means 600 provided with element rows 710 of light-receiving elements 700 is disposed at the position where the interference fringes are formed (see FIG. 9). The light source 200, the aperture 300, the mirror M, the index grating 500, and the light-receiving means 600 are provided in a head 101. The head 101 allows these configurations to be moved together back and forth relative to the scale 400. The optical encoder 100 determines the amount of displacement by using the element rows 710 (see FIG. 9) to detect the phase changes in the interference fringes associated with the change in the relative position between the head 101 and the scale 400.

FIG. 9 is a diagram showing conventional light-receiving means 600. Specifically, FIG. 9 shows the light-receiving means 600 along with a light interference pattern p resulting from diffraction at the aperture in the light beam emitted into the light-receiving means 600. The light-receiving means 600 is provided with multiple element rows 710. Each element row 710 is provided with multiple light-receiving elements 700 arranged along the measurement direction with a pitch equal to the period of the interference fringes generated by diffraction at the scale and index grating. The element rows 710 are arranged in a direction (Y-direction) orthogonal to the measurement direction (X-direction) on a light-receiving surface of the light-receiving means 600. In addition, the element rows 710 are staggered along the measurement direction (X-direction). Specifically, the light-receiving means 600 includes: an A-phase element row 711 for detecting an A-phase signal; a B-phase element row 712 for detecting a B-phase signal; an AB-phase element row 713 for detecting an AB-phase signal; and a BB-phase element row 714 for detecting a BB-phase signal, and thus, it detects four-phase signals. With respect to the A-phase element row 711, the B-phase element row 712 is staggered in the measurement direction (X-direction) such that it has a phase difference of 90°, the AB-phase element row 713 is staggered such that it has a phase difference of 180°, and the BB-phase element row 714 is staggered such that it has a phase difference of 270°. By arranging multiple sets of element rows 710 for such four phases (hereinafter referred to as "element row groups") in the orthogonal direction, even if there are variations in light intensity within the beam emitted into the light-receiving means 600, the variations in the signal intensities of the respective phases are mitigated by averaging the intensities of the received light among the multiple sets of element row groups.

SUMMARY OF THE INVENTION

Problems to be Solved by the Invention

In the optical encoder 100 configured in this way, unwanted light, such as stray light that has passed through an unintended optical path or high-order diffraction light, may enter into the light-receiving surface 610 of the light-receiving means 600. The aperture 300 (see FIG. 8) is a beam-shaping element with an opening provided in a shielding plate, and it limits the size and shape of the light beam so as to be as small as possible in order to prevent such unwanted light from entering. More specifically, the minimum required shape and size of the light beam are the same as those of a light-receiving area 620 (the area where the light-receiving elements 700 are formed) in the light-receiving means 600, but the actual shape and size of the light beam are set so as to be the above-described minimum required shape and size plus the margin required for the assembly of the optical encoder 100, the processing accuracy, and the space required due to the restriction of the processing process of the opening to be provided in the shielding plate.

FIG. 10A is a schematic diagram showing a conventional aperture 300. For example, the aperture 300 has an opening 310 in the shape of an elongated hole (a through-hole in the shape where the short sides of a rectangle are replaced by semi-circular arcs), as shown in FIG. 10A. The light limited by such aperture 300 becomes a light beam with the shape substantially equal to that of the opening of 310, and enters into the light-receiving means 600 by way of a scale of 400, or the like (see FIG. 8). At this time, the light beam enters into the light-receiving means 600 so that a rectangular portion at the center of the light beam covers the light-receiving area 620 in the light-receiving means 600.

Except for the interference fringes generated by the diffraction grating, which are necessary for determining the displacement amount, it is desirable that the light intensity inside the light beam entering the light-receiving means 600 is substantially uniform. However, when the light from the light source 200 (see FIG. 8) passes through the aperture 300, a diffraction phenomenon occurs at the edge 320 of the opening 310, and thus, unwanted and regular light interference patterns may be formed at the light-receiving surface 610 of the light-receiving means 600.

FIG. 10B is a diagram showing an example of the light interference pattern p generated in association with the diffraction at the edge 320 of the conventional opening 310. As shown in FIG. 10B, in the light interference pattern p, alternating light and dark patterns are formed substantially parallel to the contour of the light beam. When the light beam is limited to be as small as possible so as to cover the light-receiving area 620, the portion of the light beam along the measurement direction at the contour of the light beam will have a shape correlated with the shape of the section of the light-receiving area 620 extending in the measurement direction at the contour of the light-receiving area 620 (in this case, the portion and the section are both linear). Then, as shown in FIG. 9, the distribution of the light and dark portions of the light interference pattern p overlaps with the element rows 710. For example, the light portions of the light interference pattern p enter into the A-phase element row 711 and the B-phase element row 712, whereas the dark portions of the light interference pattern p enter into the AB-phase element row 713 and the BB-phase element row 714, and there may therefore be a significant difference in the intensities of the received light among the element rows.

Such significant differences in the intensities of the received light among the element rows cannot be sufficiently canceled out with the averaging approach where multiple sets of element row groups are used, and when determining differential signals (a differential A-phase signal and a differential B-phase signal) by using combinations of an A-phase signal (0°) with an AB-phase signal (180°), and a B-phase signal (90°) with a BB-phase signal (270°), a DC offset may be generated in the differential signals and/or a difference in amplitude may be generated. Under the presence of a DC offset, the center positions of the Lissajous curves drawn by the differential A-phase signal and the B-phase signal may become offset from the origin. In addition, under the presence of a difference in amplitude, the shape of the Lissajous curve (ideally circular) may deform (becoming oblong) or shrink. These issues become the factors in deteriorating the measurement accuracy.

In addition, in the above-described configuration, if there is a misalignment in the distance between the scale 400 and the head 101, the orientation (relative angle) of the head 101 relative to the scale 400, or the like, as shown in FIG. 8, the position of the light interference pattern p (see FIG. 10B) relative to the light-receiving means 600 may change. As such, the average amount of light of the light emitted into each element row 710 varies, and in association with this, the detected signals also vary, thereby causing errors, which leads to a decrease in the measurement accuracy.

An object of the present invention is to provide an optical encoder that can reduce the effects of the light interference patterns in the light beam that may occur in association with diffraction in a beam-shaping element, such as an aperture disposed between the light source and the scale.

Means for Solving the Problems

The optical encoder of the present invention comprises: a scale having a scale grating arranged with a predetermined period along a measurement direction; a light source that emits light toward the scale; and light-receiving means that has a light-receiving area, the light-receiving area having multiple light-receiving elements arranged with a predetermined period in the measurement direction, and receiving light that has passed through the scale. The optical encoder also comprises a beam-shaping element that shapes the beam shape, which is the shape of the light emitted from the light source. The beam-shaping element is disposed between the light source and the scale, and defines the beam shape such that the shape of a long-length contour portion and the shape of a long-length side section have no correlation with each other, wherein the long-length contour portion is a portion the beam shape extending in the measurement direction at the contour of the beam shape of the light from the light source emitted into the light-receiving means via the scale, and the long-length side section is a section of the light-receiving means extending in the measurement direction at the contour of the light-receiving means.

Here, the light-receiving area refers to an area of the light-receiving surface of the light-receiving means, where the light-receiving elements are provided. In addition, the shape of the long-length contour portion having no correlation with the shape of the long-length side section refers to a shape that has no commonality or similarity between the two shapes, such as in the case where one of them is linear and the other is curved or wavy. Further, the shape of the edge of the beam-shaping element does not necessarily coincide with the contour of the beam shape. Specifically, the shape of the edge of the beam-shaping element and the contour of the beam shape of the beam emitted into the light-receiving surface may have different shapes, when the light is emitted into the beam-shaping element at a predetermined angle, when the light is emitted via multiple beam-shaping elements with different shapes, or the like. The beam-shaping element defines the shape of the beam emitted into the light-receiving surface.

According to the present invention, by defining shape of the long-length contour portion by means of the beam-shaping element such that it has no correlation with the shape of the long-length side section, it is possible to prevent the light interference pattern and the interference fringes arising from the signal light from being overlapping with each other with correlativity therebetween. This makes it possible to prevent effects on the interference fringes, and to suppress a decrease in the detection accuracy and measurement accuracy. Accordingly, the optical encoder is capable of reducing the effects of unwanted light that may occur due to an optical element (the beam-shaping element), such as an aperture disposed between the light source and the scale.

Preferably, in this case, the shape of the long-length side section is linear.

According to such a configuration, it is possible to detect signals in a stable manner even if there is an adhering substance, such as dirt, on the light-receiving surface.

In this case, the beam-shaping element includes a beam-shaping part with edges having predetermined shapes. Preferably, the shape of the edge of the beam-shaping part, the edge defining the long-length contour portion, includes multiple circular arcs with a common radius. Desirably, the beam-shaping part has the minimum required size, which is the size of the contour, or the like, of the light-receiving area plus the minimum space.

According to such configuration, by performing some machining on the above-described minimum required size using a cutting tool, or the like, capable of drilling a hole of a predetermined diameter which forms the beam-shaping part, it is possible to easily form the beam-shaping part that defines the shape of the long-length contour portion having no correlation with the shape of the long-length side section.

Preferably, in this case, the shape of the edge of the beam-shaping part is a circular arc with the radius, the edge defining a short-length contour portion, wherein the short-length contour portion is a portion of the beam shape extending in a direction orthogonal to the measurement direction at the contour of the beam shape.

According to such configuration, at the time of forming the beam-shaping part using the cutting tool, or the like, capable of drilling a hole of a predetermined diameter, it is possible to easily form the beam-shaping part for defining the shape of the long-length contour portion having no correlation with the shape of the long-length side section, by using one type of cutting tool, or the like, with a predetermined radius, without having to use cutting tools, or the like, capable of drilling multiple holes with different radii. In addition, since the beam-shaping part can be formed with one type of cutting tool, or the like, there are no additional components, difficult manufacturing processes, machining methods, or the like, and it is therefore possible to achieve cost reduction in terms of components, time, tools, and the like, as compared to the case where different cutting tools, or the like, are used for the respective parts.

Preferably, in this case, an index grating is provided between the scale and the light-receiving means, wherein the index grating has a grating arranged with a predetermined period.

According to such a configuration, since it is possible to suppress unwanted light from the scale by means of the index grating, the optical encoder can achieve higher accuracy.

Preferably, in this case, a lens is provided between the scale and the light-receiving means, wherein the lens collects light that has passed through the scale and images the light on the light-receiving means.

According to such configuration, the optical encoder can image and detect scale random patterns using a lens imaging system. In addition, it is possible to improve the degree of freedom of design, since the optical encoder allows the optical path of light, or the like, to be freely designed owing to the disposition of the lens.

Preferably, in this case, the light emitted from the light source is laser light.

According to such configuration, since the laser light is coherent, even if there is a shift in the positions where the scale and the light-receiving means are disposed by one of them approaching, or moving away from, the other, it is still possible to maintain the intensity of the signals to be detected.

DETAILED DESCRIPTION OF THE EMBODIMENTS

First Embodiment

The first embodiment of the present invention will now be described below with reference to FIGS. 1 to 6.

Figure 1:
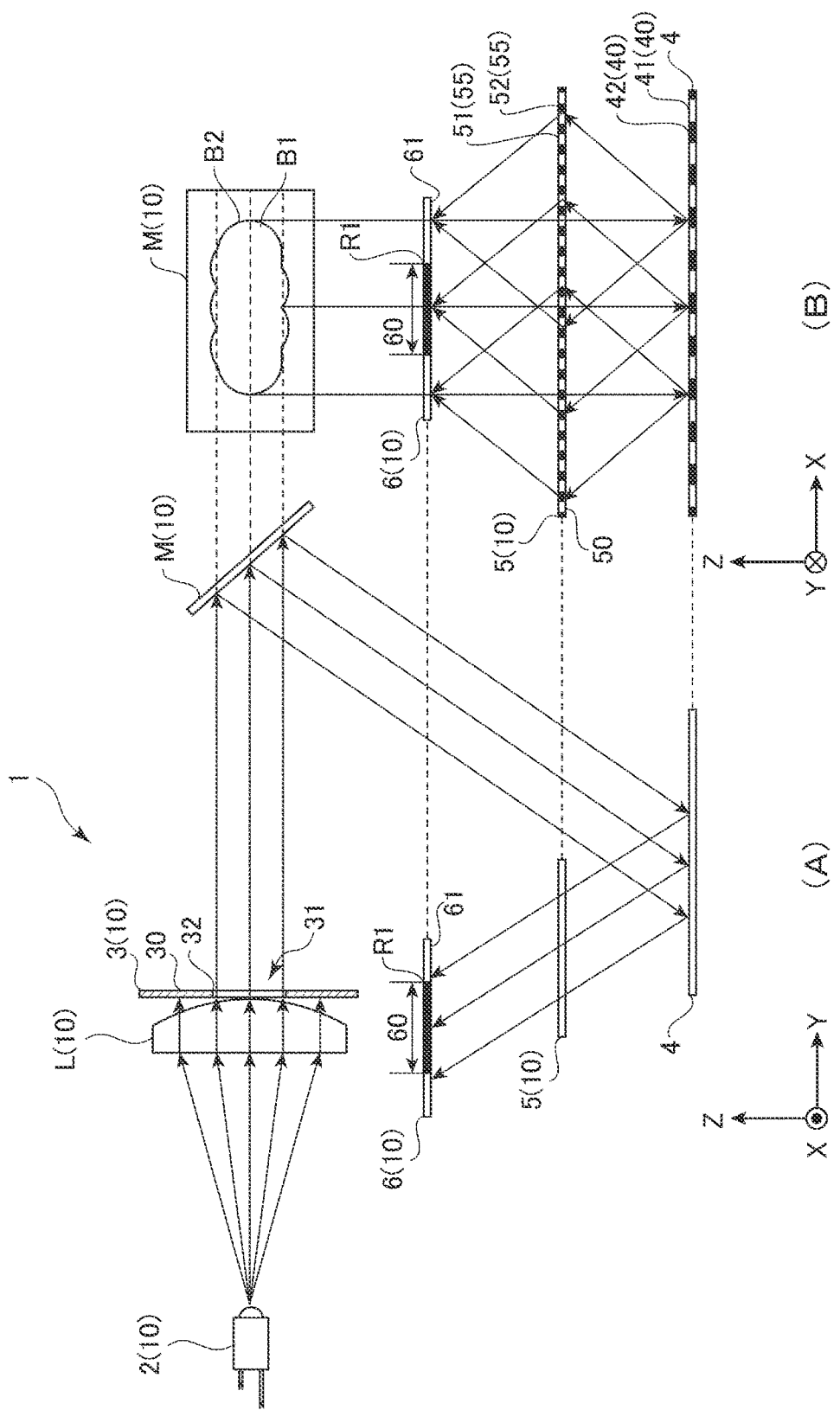
FIG. 1 is a schematic diagram showing an optical encoder according to a first embodiment.

FIG. 1 is a schematic diagram showing the optical encoder 1 according to the first embodiment. Specifically, section (A) in FIG. 1 is a schematic diagram showing the optical encoder 1 from the side, and section (B) in FIG. 1 is a schematic diagram showing the optical encoder 1 from a direction (i.e., a front direction) different from that in section (A). In FIG. 1, a portion of the light emitted from the light source 2 is illustrated by arrows to thereby indicate the directions and optical path of the light.

As shown in FIG. 1, the optical encoder 1 is provided with a light source 2, a beam-shaping element (shielding plate) 3, a scale 4, an index grating 5, and light-receiving means 6. In addition, the light source 2, the shielding plate 3, a mirror M, the index grating 5, and the light-receiving means 6 are provided in a head 10. The head 10 allows these configurations to be moved together back and forth relative to the scale 4.

The optical encoder 1 is a linear encoder provided with the plate-shaped scale 4 formed along the X-direction, which is the measurement direction; and the head 10 provided, in a movable manner, relative to the scale 4 along the X-direction. In the following descriptions and the respective drawings, the measurement direction, i.e., the lengthwise direction, of the scale 4 will be set forth as the X-direction, the widthwise direction of the scale 4 will be set forth as the Y-direction, and the height direction perpendicular to the X- and Y-directions will be set forth as the Z-direction. In particular, regarding the shielding plate 3, the lengthwise direction or the widthwise direction may simply be used.

The linear encoder obtains positional information from the amount of relative movement between the scale 4 and the head 10 by moving the head 10 along the scale 4.

The light source 2 emits light with a constant width toward the scale 4. The light source 2 is, for example, a semiconductor laser. Therefore, the light emitted from the light source 2 is laser light. Laser light has a better coherency as compared to the light from light emitting diodes (LEDs). Specifically, if, for example, there is a difference in the optical path length between two light rays from the LED to the light-receiving means 6, interference fringes may not be generated on the light-receiving means 6. However, if a diode laser with a coherent length of several centimeters is used, even if there is a difference in the optical path length between two light rays from the diode laser to the light-receiving means 6, interference fringes can still be generated on the light-receiving means 6, as long as such difference is within a few centimeters. For this reason, a semiconductor laser is employed in the optical encoder 1 as the light source 2. Obviously, the light source 2 is not limited to semiconductor lasers, and any light source may be employed as long as it has a coherent length capable of generating interference fringes (interference light). For example, the light source may be a helium neon laser with a coherent length of several meters, or the aforementioned LED. A collimator lens L is disposed between the light source 2 and the shielding plate 3. The collimator lens L collimates the light from the light source 2.

The shielding plate 3 is a beam-shaping element that shapes the beam shape B1, which is the shape of the light emitted from the light source 2, and is an optical element for limiting the extent of the light emitted into the scale 4. The shielding plate 3 is disposed on the optical path of the light between the light source 2 and the scale 4. The light that has passed through the collimator lens L is reflected by the mirror M, after going through the shielding plate 3, and directed toward the scale 4, and is then diffracted by the scale 4 and emitted into the light-receiving means 6 via the index grating 5. The details of the shielding plate 3 will be described later.

The mirror M is disposed between the shielding plate 3 and the scale 4. The mirror M enables the traveling direction of light to be freely designed by being disposed midway along the optical path of the light emitted from the light source 2. In this embodiment, the light from the light source 2 will travel in a direction away from the scale 4 if the light is emitted directly without the mirror M being disposed. By disposing the mirror M at a predetermined angle, the traveling direction of the light can be changed and the light from the light source 2 can be emitted into the scale 4.

The scale 4 is made of glass, or the like, and is formed in a plate shape. On one side of the scale 4, a scale grating 40 is provided, with reflective parts and non-reflective parts being arranged with a predetermined period along the X-direction. The scale grating 40 is provided with a reflective part 41 that reflects light from the light source 2 and a non-reflective part 42 that absorbs, or the like, light without reflecting the light. The reflective part 41 is a metal plate that is machined to reflect light. The non-reflective part 42 is applied with an anti-reflective agent that absorbs light so that it does not reflect light. The reflective part 41 and the non-reflective part 42 have an equal width and are arranged at equal intervals. The reflective part 41 may not need to be a metal plate, as long as it can reflect light. For example, the reflective part 41 may be a mirror, or the like. The scale grating 40 serves as a diffraction grating for diffracting incident light, and diffracts and divides the light emitted from the light source 2 into a 0-order light ray, +/−1-order light rays, +/−2-order light rays, and the like.

The index grating 5 is disposed between the scale 4 and the light-receiving means 6. The index grating 5 guides the light diffracted and divided by the scale 4 onto the light-receiving area 60 of the light-receiving means 6. The index grating 5 has a plate surface 50 parallel to the surface of the scale 4 on which the scale grating 40 is disposed, and comprises a grating 55 on the plate surface 50 along the X-direction, which is a predetermined direction. The grating 55 has a convex part 51 and a recess part 52. The convex part 51 and the recess part 52 are formed in an alternating manner and arranged with a predetermined period along the X-direction, which is the measurement direction. The index grating 5 is a transmissive-type diffraction grating plate formed by a plate material made of synthetic quartz. The index grating 5 may not need to be formed by a plate material made of synthetic quartz, and any index grating may be employed, as long as it is a transparent plate material. The index grating 5 re-diffracts the light diffracted by the scale 4, and redirects the +1-order light ray and the −1-order light ray in the directions along which they intersect.

The light that has passed through the scale grating 40 and the index grating 5 forms interference fringes, on the light-receiving means 6, in which the phases vary in accordance with the relative movement between the scale 4 and the head 10. The period of the interference fringes corresponds to the period of the scale grating 40. The optical encoder 1 takes the +/−1-order light rays as signal light, and uses the interference fringes formed by the +/−1-order light rays for detection. The light other than the +/−1-order light rays is unwanted light that does not contribute to the measurement.

Figure 2:
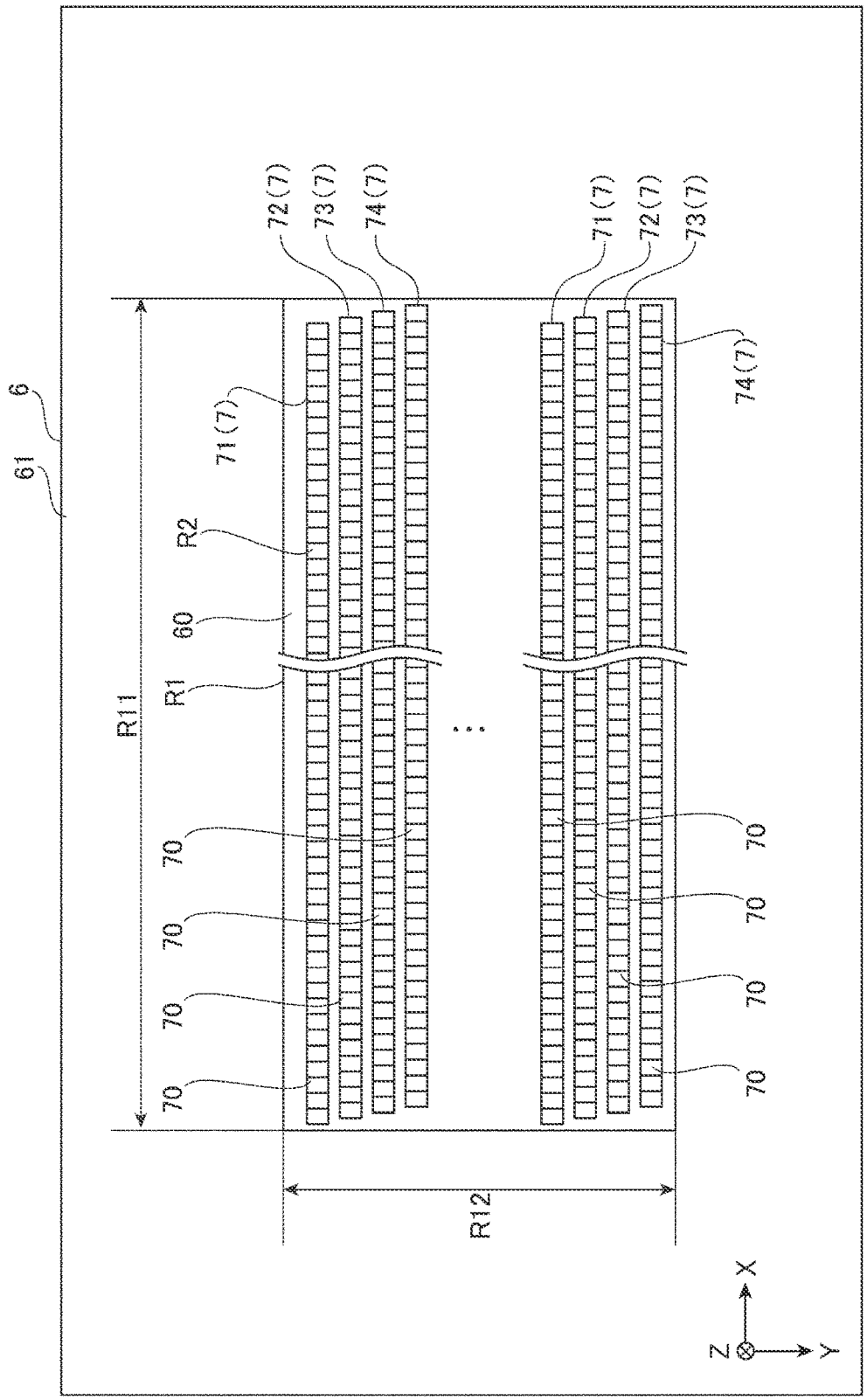
FIG. 2 is a schematic diagram showing light-receiving means in the above-described optical encoder.

FIG. 2 is a schematic diagram showing the light-receiving means 6 in the optical encoder 1.

As shown in FIG. 2, the light-receiving means 6 is disposed parallel to the XY-plane surface, which is the plate surface of the scale 4. The light-receiving means 6 includes the light-receiving area 60 that receives light from the light source 2 via the scale 4. The light-receiving means 6 receives the light that has passed through the scale 4, detects the interference fringes formed by such light, and outputs detection signals corresponding to the phases of the detected interference fringes. A photo diode array (PDA) is used for the light-receiving means 6. A PDA is a detector with the ability to measure multiple interference fringes at once. The light-receiving means 6 is not limited to PDAs and any detector may be used, such as a charge-coupled device (CCD), or the like.

The light-receiving area 60 includes multiple element rows 7. Each element row 7 is provided with multiple light-receiving elements 70 arranged along the X-direction, which is the measurement direction, with the same period as that of the interference fringes. A plurality of element rows 7 are arranged in the Y-direction orthogonal to the X-direction in the light-receiving area 60. In addition, the element rows 7 are staggered along the X-direction. Specifically, the element rows 7 include an A-phase element row 71, a B-phase element row 72, an AB-phase element row 73, and a BB-phase element row 74. With respect to the A-phase element row 71, the B-phase element row 72 is staggered in the X-direction with a phase difference of 90°, the AB-phase element row 73 is staggered with a phase difference of 180°, and the BB-phase element row 74 is staggered with a phase difference of 270°, in terms of the arrangement pitch (i.e., the period) of the light-receiving elements 70 configuring the element rows 7.

Based on this configuration, the A-phase element row 71 outputs an A-phase signal, the B-phase element row 72 outputs a B-phase signal with a phase difference of 90° from the A-phase signal, the AB-phase element row 73 outputs an AB-phase signal (i.e., a negative-phase signal of the A-phase) with a phase difference of 180° from the A-phase signal, and the BB-phase element row 74 outputs a BB-phase signal (i.e., a negative-phase signal of the B-phase) with a phase difference of 270° from the A-phase signal. In other words, the light-receiving means 6 outputs four-phase signals as detection signals. The detection signal varies in accordance with the relative movement between the scale 4 and the head 10. By arranging multiple sets of element rows 7 for such four phases (i.e., the element row groups) in the orthogonal direction, even if there are variations in the light intensity within the beam emitted into the light-receiving means, the variations in the signal intensities of the respective phases are mitigated by averaging the intensities of the received light among the multiple sets of element row groups.

Figure 3:
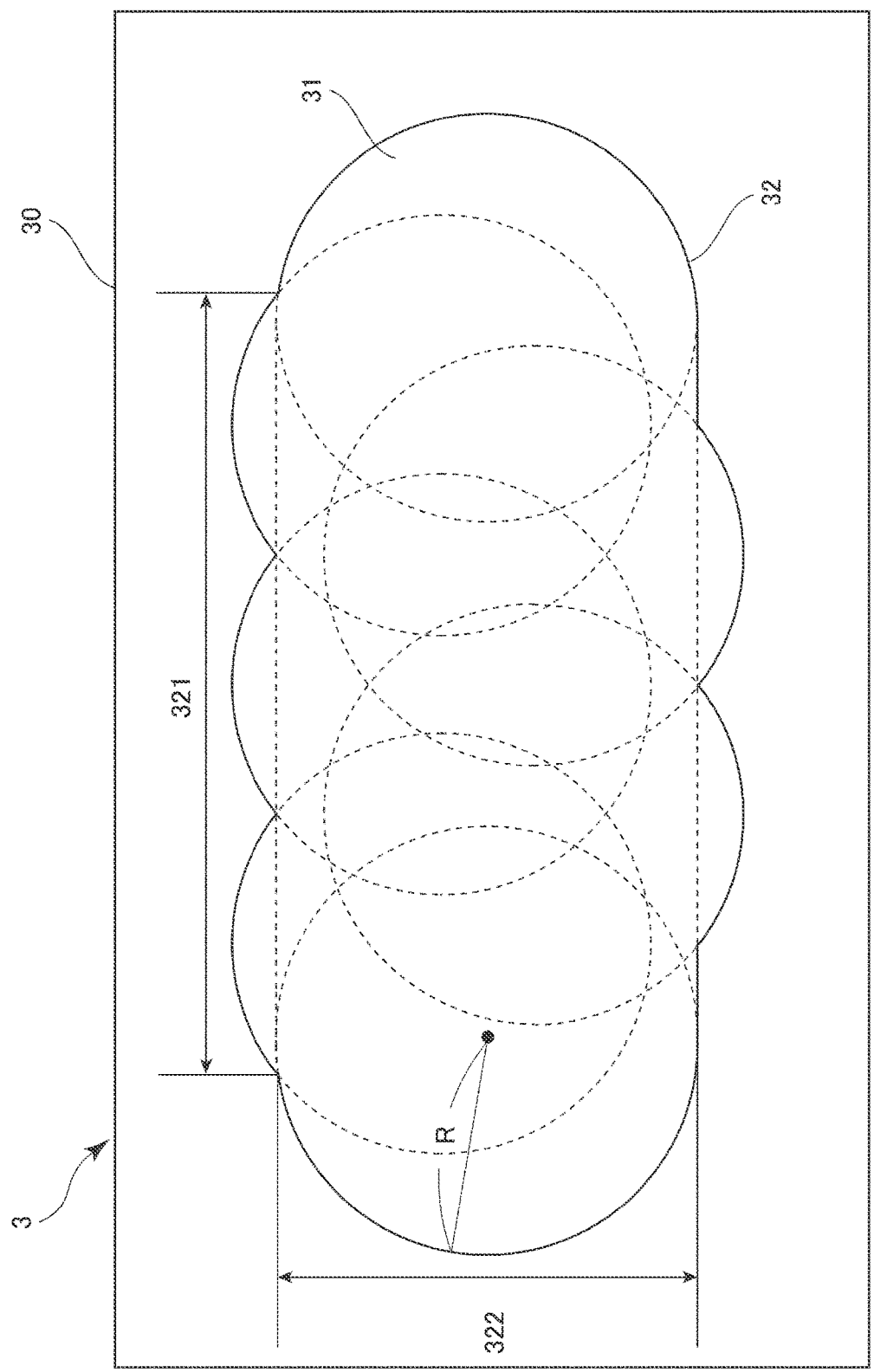
FIG. 3 is a diagram showing a beam-shaping element (shielding plate) in the above-described optical encoder.

FIG. 3 is a diagram showing the shielding plate 3 in the optical encoder 1.

As shown in FIG. 3, the shielding plate 3 is provided with a plate-shaped base 30 and an opening 31. The opening 31 is a beam-shaping part formed in the shielding plate 3, and is formed by drilling a hole in the base 30 with a cutting tool, or the like, capable of drilling a hole of a predetermined diameter. The opening 31 then has a predetermined edge 32. The edge 32 consists of long-length edge sections 321 formed along the lengthwise direction, and short-length edge sections 322 shorter than the long-length edge sections 321 and formed along the widthwise direction.

The long-length edge section 321 defines a long-length contour portion B21 (see FIG. 4), which is a portion of the beam shape B1 at the contour B2 of the beam shape B1 and extends in the lengthwise direction. The long-length edge section 321 includes multiple circular arcs with a common radius R. Specifically, one of the long-length edge sections 321 (the upper edge in FIG. 3) includes three circular arcs, and the other of the long-length edge sections 321 (the lower edge in FIG. 3) includes two circular arcs. With such formation, the difference in the amount of light of the light emitted into the light-receiving area 60 can be averaged out through randomization, and it is possible to suppress detection errors, or the like, that may occur due to the light passing through the shielding plate 3.

The short-length edge section 322 defines a short-length contour portion B22 (see FIG. 4), which is a portion of the beam shape B1 at the contour B2 of the beam shape B1 and extends in the widthwise direction orthogonal to the lengthwise direction. The short-edge section 322 consists of a circular arc with the same radius R as that of the circular arcs configuring the long-length edge section 321.

The opening 31 with such a shape can be formed using a cutting tool, such as a drill or milling cutter, that is capable of machining with the same radius R as that of the circular arcs configuring the long-length edge sections 321 and the short-length edge sections 322. In other words, by expanding the initial hole with a cutting tool capable of machining with a radius R, it is possible to form, with ease, openings with complex shapes containing circular arcs with a radius R in the long-length edge sections 321 and the short-length edge sections 322 as described above. As multiple tools and/or difficult processes are not required, it is possible to suppress the cost and time of machining.

Figure 4:
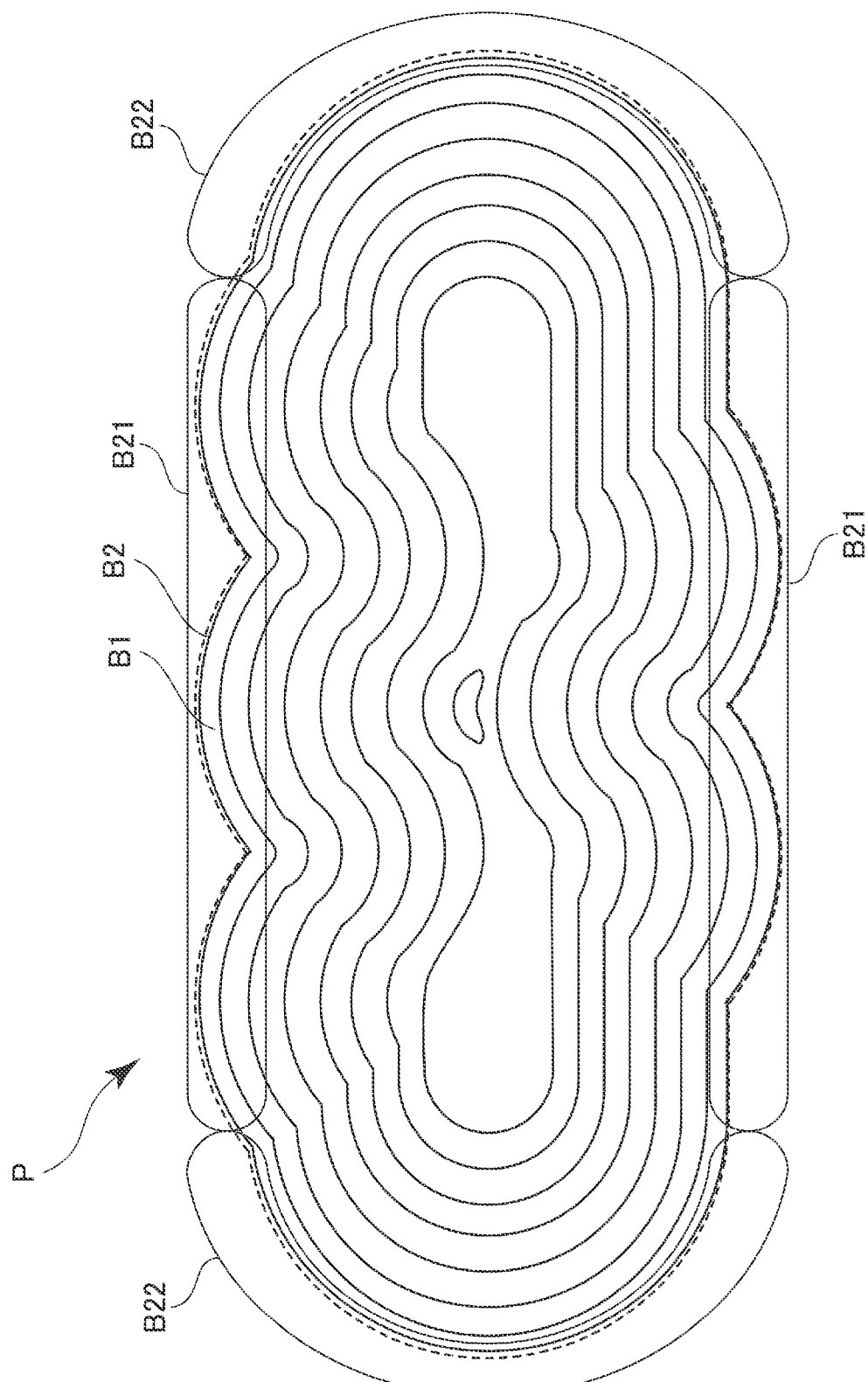
FIG. 4 is a schematic diagram showing the shape of the beam emitted into the light-receiving means in the above-described optical encoder, and the light interference patterns.

FIG. 4 is a schematic diagram showing the beam shape B1 and the light interference patterns P emitted into the light-receiving means 6 in the optical encoder 1.

As shown in FIG. 4, the beam shape of the light that has passed through the opening 31 is limited by the edge 32 of the opening 31, and the light is emitted into a light-receiving surface 61 (see FIG. 2) of the light-receiving means 6 as the light with the beam shape B1 having a contour B2.

Here, the shape of the edge 32 of the opening 31 (see FIG. 3) and the contour B2 of the beam shape B1 may not necessarily be identical and therefore may not coincide. For example, the shape of the edge 32 of the opening 31 and the contour B2 of the beam shape B1 of the beam emitted into the light-receiving area 60 may have different shapes, when, as shown in FIG. 1,: the light emitted into the scale 4 is adjusted so that it will be emitted thereto at an angle by adjusting the angle of the mirror M; the light is emitted into the shielding plate 3 at a predetermined angle; the light is emitted via multiple shielding plates with different shapes; or the like. Although in this embodiment, in order to simplify the description, the shape of the edge 32 of the opening 31 and the contour B2 of the beam shape B1 of the beam emitted into the light-receiving area 60 are illustrated and described as if they were identical, strictly speaking, they cannot be identical because the light that has passed through the shielding plate 3 in a vertical manner is made incident on the light-receiving means 6 at an angle, as shown in FIG. 1.

Figure 5:
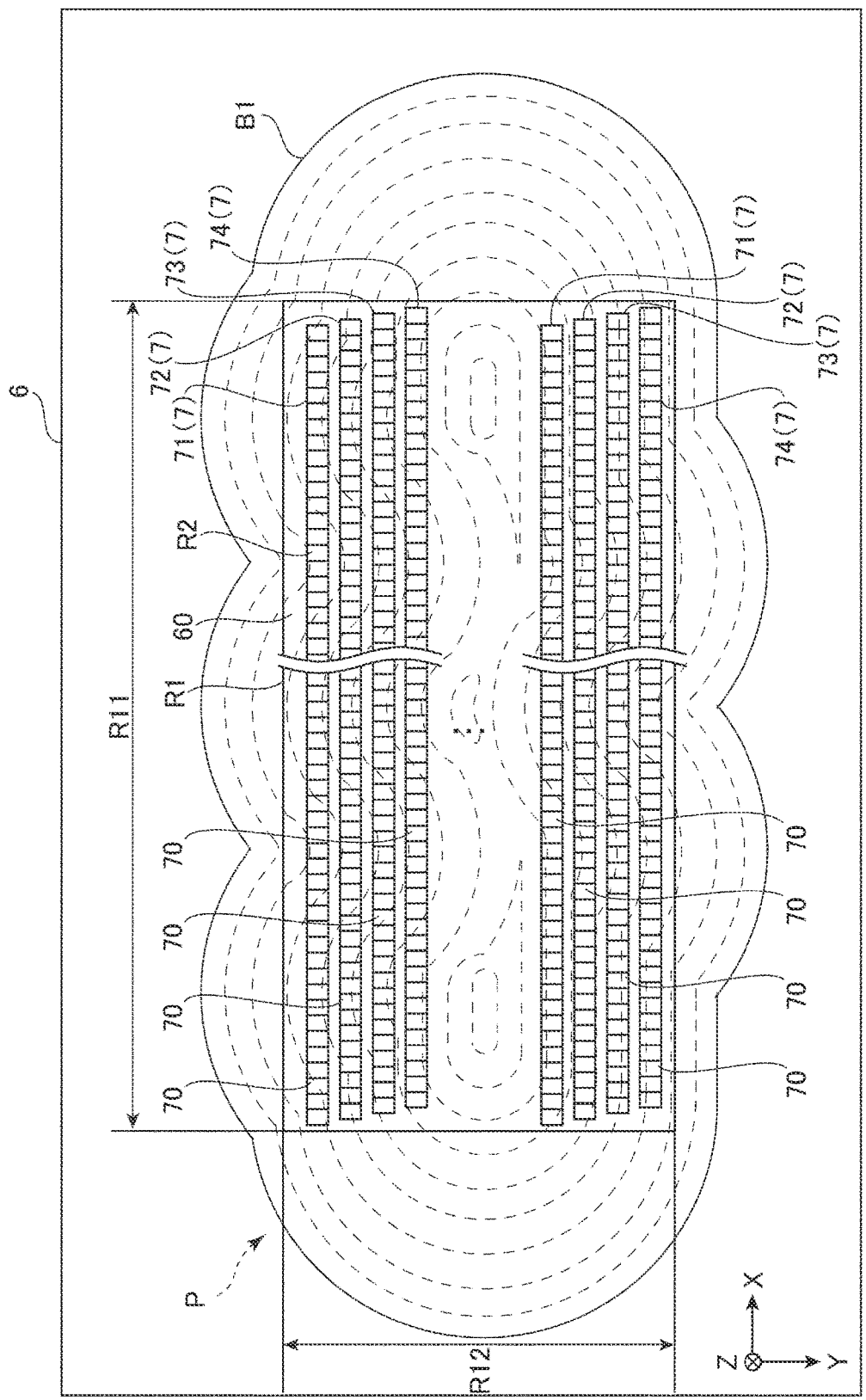
FIG. 5 is diagram in which the beam shape is overlaid on the light-receiving means in the above-described optical encoder.

A light interference pattern P is generated, which is the distribution of light and dark portions caused by diffraction at the edge 32 of the opening 31, inside the beam shape B1 shown in FIG. 4. The light interference pattern P is formed as a pattern with alternating light and dark portions in an annual-growth ring shape along the contour of the beam shape B1 of the light. In FIG. 5, which will be described below, the amount of light is low in the dashed sections, while the amount of light is high in the white sections between the dashed sections.

FIG. 5 is a diagram in which the beam shape B1 is overlaid on the light-receiving means 6 in the optical encoder 1. In this embodiment, a long-length side section R11 of the light-receiving area 60 extending in the X-direction at the contour R1 of the light-receiving area 60 is formed in a linear manner, and a short-length side section R12 of the light-receiving area 60 extending in the Y-direction orthogonal to the X-direction at the contour R1 of the light-receiving area 60 is also similarly formed in a linear manner. In other words, the contour R1 of the light-receiving area 60 is formed in a rectangular shape. The beam shape B1 is defined by the shielding plate 3 so that the shape of the long-length contour portion B21 extending in the X-direction is not correlated with the shape of the long-length side section R11. In addition, the beam shape B1 is defined at the opening 31 such that it has a size large enough to encompass the entire light-receiving area 60.

Here, the shape of the long-length contour portion B21 of the beam shape B1 having no correlation with the shape of the long-length side section R11 of the contour R1 of the light-receiving area 60 refers to a shape that has no commonality or similarity between the two shapes, as in the case of the present embodiment where the shape of the long-length side section R11 is linear and the shape of the long-length contour portion B21 is a combination of curves. Preferably, the long-length contour portion B21 and the long-length side section R11 may be spaced apart from each other by a distance equal to or more than the dimension of the light-receiving element in the direction orthogonal to the measurement direction.

Figure 6A:
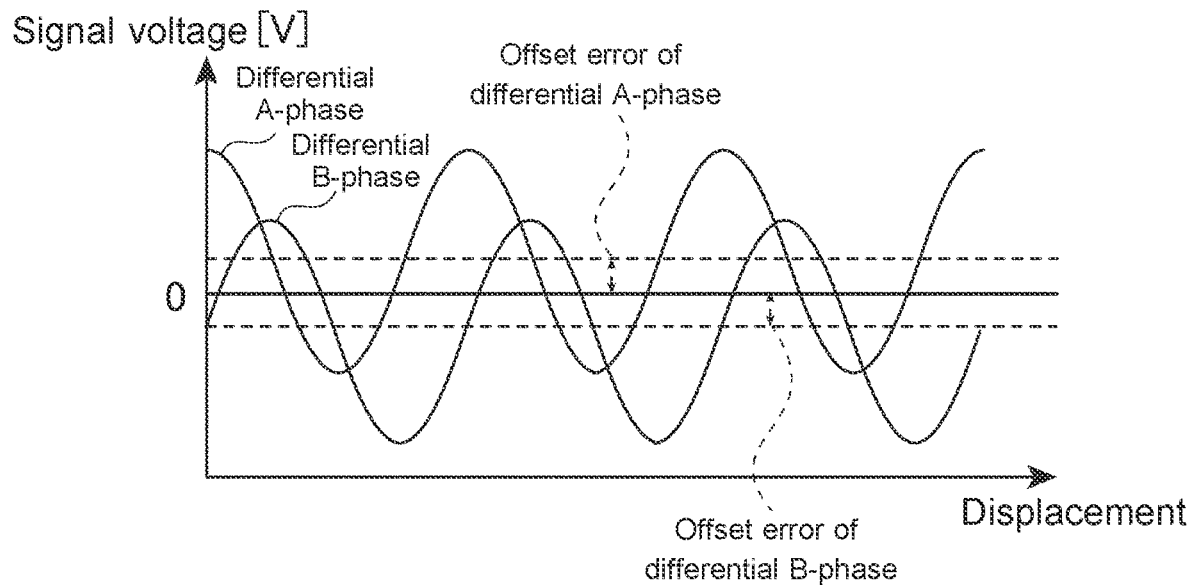
FIGS. 6A and 6B are graphs representing the relationship between the signal level (voltage) of the detection signals (differential signals of the two phases) and the displacement in the optical encoder.
Figure 6B:
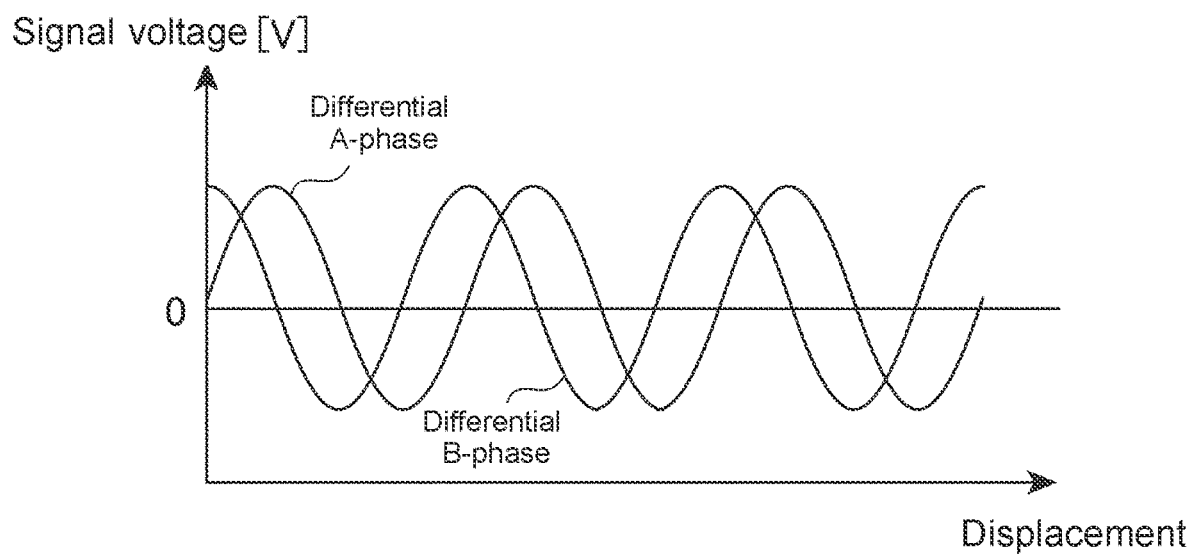
Figure 10A:
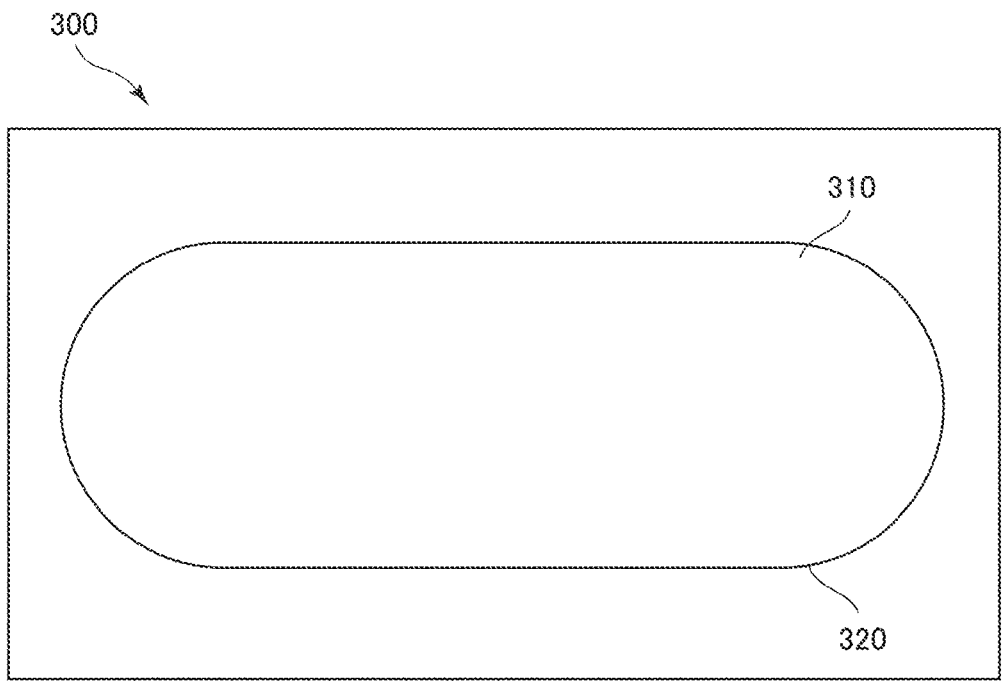
FIG. 10A is a schematic diagram showing a conventional aperture.
Figure 10B:
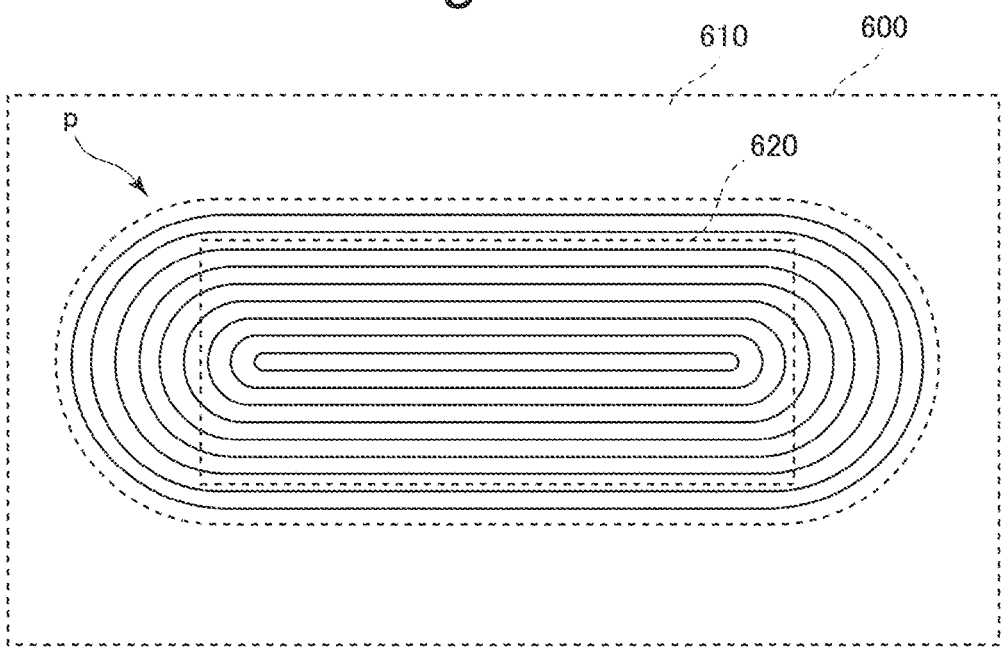
FIG. 10B is a diagram showing an example of a light interference pattern generated in association with diffraction at an edge of an opening of the conventional aperture.

FIG. 6 shows graphs representing the relationship between the signal level (voltage) of the detection signals (differential signals of the two phases) and the displacement in the optical encoder. Specifically, FIG. 6A is a graph representing the detection signals obtained with an optical encoder provided with an aperture with a conventional oblong opening as shown in FIG. 10A. FIG. 6B is a graph representing the detection signals obtained with the optical encoder 1 of the present embodiment provided with the aperture (shielding plate 3) with an irregularly-shaped opening 31.

In the optical encoder with the conventional aperture, the light and dark portions (the difference in the amount of light) of the light interference pattern have disproportionate effects on each element row, resulting in a significant difference in the intensities of the received light among the element rows. As a result, when differential signals (a differential A-phase signal and a differential B-phase signal) are determined using combinations of an A-phase signal with an AB-phase signal, and a B-phase signal with a BB-phase signal, an offset error such as shown in FIG. 6A may be generated. Under the presence of an offset, the center positions of the Lissajous curves drawn by the differential A-phase signal and the B-phase signal may become offset from the origin, and this becomes a factor in deteriorating the measurement accuracy. In addition, an offset error may also be generated if a misalignment occurs regarding the positions where the scale 4 and the light-receiving means 6 are disposed, and therefore the orientation of the head 10 relative to the scale 4 changes or shifts.

In contrast, in the optical encoder 1 of the present embodiment provided with the aperture (shielding plate 3) with an opening 31 having an irregular shape, the difference in the intensities of the received light among the element rows (and among phases) is suppressed owing to an averaging effect in which the amount of light of the light emitted into the light-receiving area 60 is dispersed (i.e., randomized) (more specifically, a configuration is provided where both light and dark portions of the light interference pattern P are made incident on a single element row 7 in an irregular manner). As a result, when differential signals (a differential A-phase signal and a differential B-phase signal) are determined by using combinations of an A-phase signal with an AB-phase signal, and a B-phase signal with a BB-phase signal, detection signals in which the offset errors are suppressed can be obtained, as shown in FIG. 6B. In addition, even if the aforementioned misalignment occurs, the offset errors are reduced compared to the conventional method, and the effects on the detection accuracy are negligible.

In this way, by making the shape of the long-length contour portion B21 and the shape of the long-length side section R11 have no correlation with each other, it is possible to avoid disproportionate incidence of the light and dark portions of the light interference pattern P on a single element row 7, and to suppress the difference in the intensities of the received light among the element rows. As a result, the signal level difference between each phase of the four-phase signals is reduced, and it is therefore possible to prevent the generation of a DC offset in the differential signals and/or the generation of a difference in amplitude when the differential signals (a differential A-phase signal and a differential B-phase signal) are determined.

According to such first embodiment, the following advantageous effects can be achieved.

(1) By defining the beam shape B1, by means of the shielding plate 3, such that it has no correlation with the shape of a section (i.e., the long-length side section R11) of the light-receiving means 6 extending in the X-direction at the contour R1 of the light-receiving means 6, it is possible to prevent the light interference pattern P and the element rows 7 of the light-receiving elements 70 from being overlapping with each other with correlativity therebetween. This makes it possible to prevent disproportionate effects of the light and dark portions (the difference in the amount of light) of the light interference pattern P on each element row 7, and to suppress a decrease in the detection accuracy and measurement accuracy due to the offset errors in the detection signals.

(2) By forming the long-length side section R11 of the light-receiving area 60 at the contour R1 of the light-receiving area 60 in a linear manner, it is still possible to detect signals in a stable manner even if there is an adhering substance, such as dirt, on the light-receiving area 60 and/or the scale 4, which may become noise in the detection.

(3) By performing machining for the minimum required size using a cutting tool, or the like, for forming an opening 31, it is possible to easily form the opening 31 for defining the beam shape B1 which has no correlation with the long-length side section R11 of the light-receiving area 60 at the contour R1 of the light-receiving area 60.

(4) At the time of forming the opening 31 using the cutting tool, or the like, it is possible to easily form the opening 31 for defining the beam shape B1 which has no correlation with the long-length side section R11 of the light-receiving area 60 at the contour R1 of the light-receiving area 60, by using one type of cutting tool, or the like, with a predetermined radius R, without having to use multiple cutting tools, or the like, with different radii R.

(5) Since the opening 31 can be formed with one type of cutting tool, or the like, there are no additional components, difficult manufacturing processes, machining methods, or the like, and it is therefore possible to achieve cost reduction in terms of components, time, tools, and the like, as compared to the case where different blades or tools are used for the respective parts.

(6) Since it is possible to suppress unwanted light from the scale 4 by means of the index grating 5, the optical encoder 1 can achieve higher accuracy.

(7) Since the laser light emitted from the light source 2 is coherent, even if there is a shift in the positions where the scale 4 and the light-receiving means 6 are disposed by one of them approaching, or moving away from, the other, it is still possible to maintain the intensity of the signals to be detected.

Second Embodiment

The second embodiment of the present invention will be described below with reference to FIG. 7. In the following description, previously described parts are denoted by the same reference numbers and the descriptions thereof will be omitted.

In the first embodiment, the head 10 in the optical encoder 1 employs an index grating 5. In the second embodiment, the head 10A in the optical encoder 1A differs from the first embodiment in that it does not have an index grating 5 but instead has a lens 5A.

Figure 7:
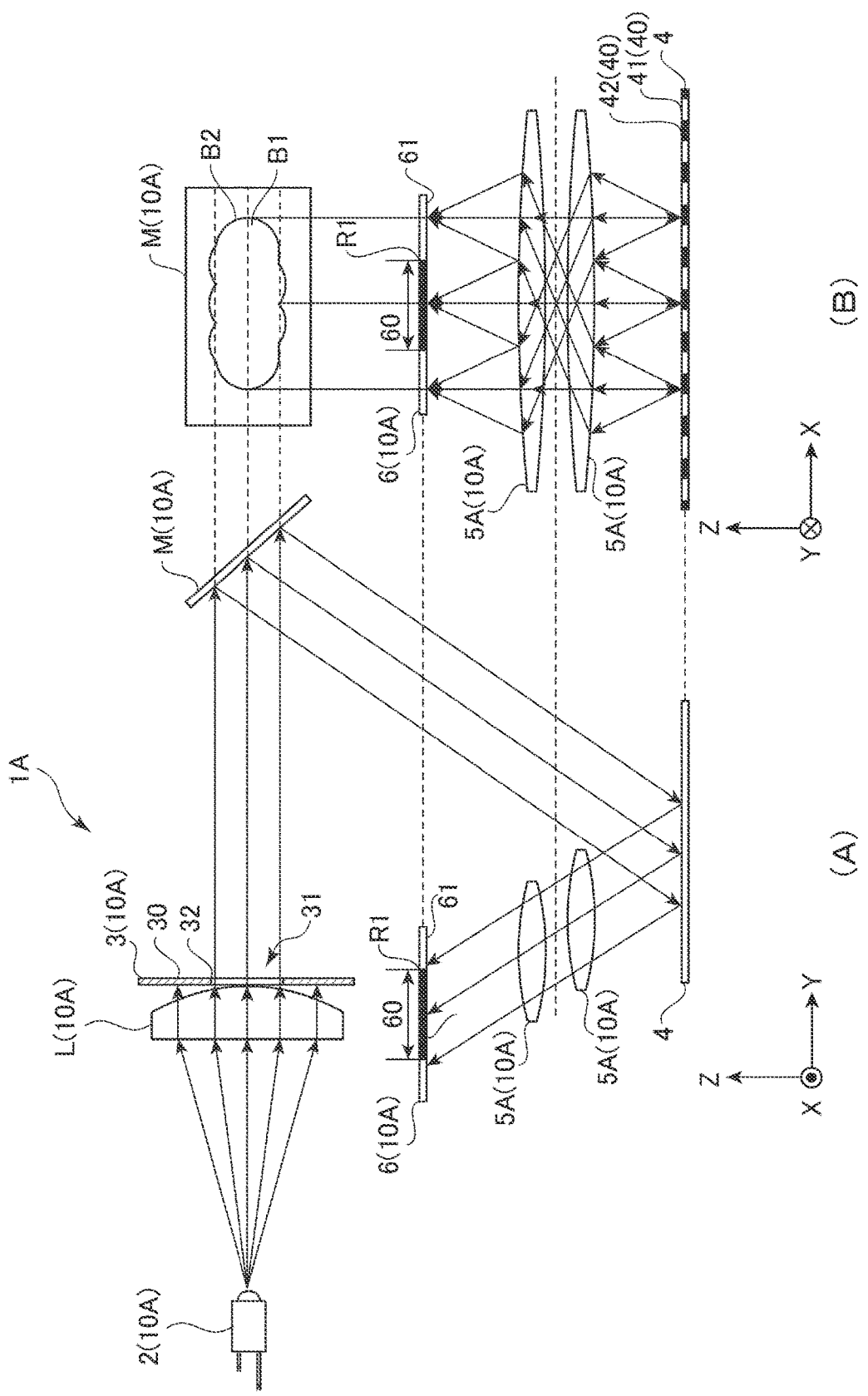
FIG. 7 is a schematic diagram showing an optical encoder according to a second embodiment.
Figure 8:
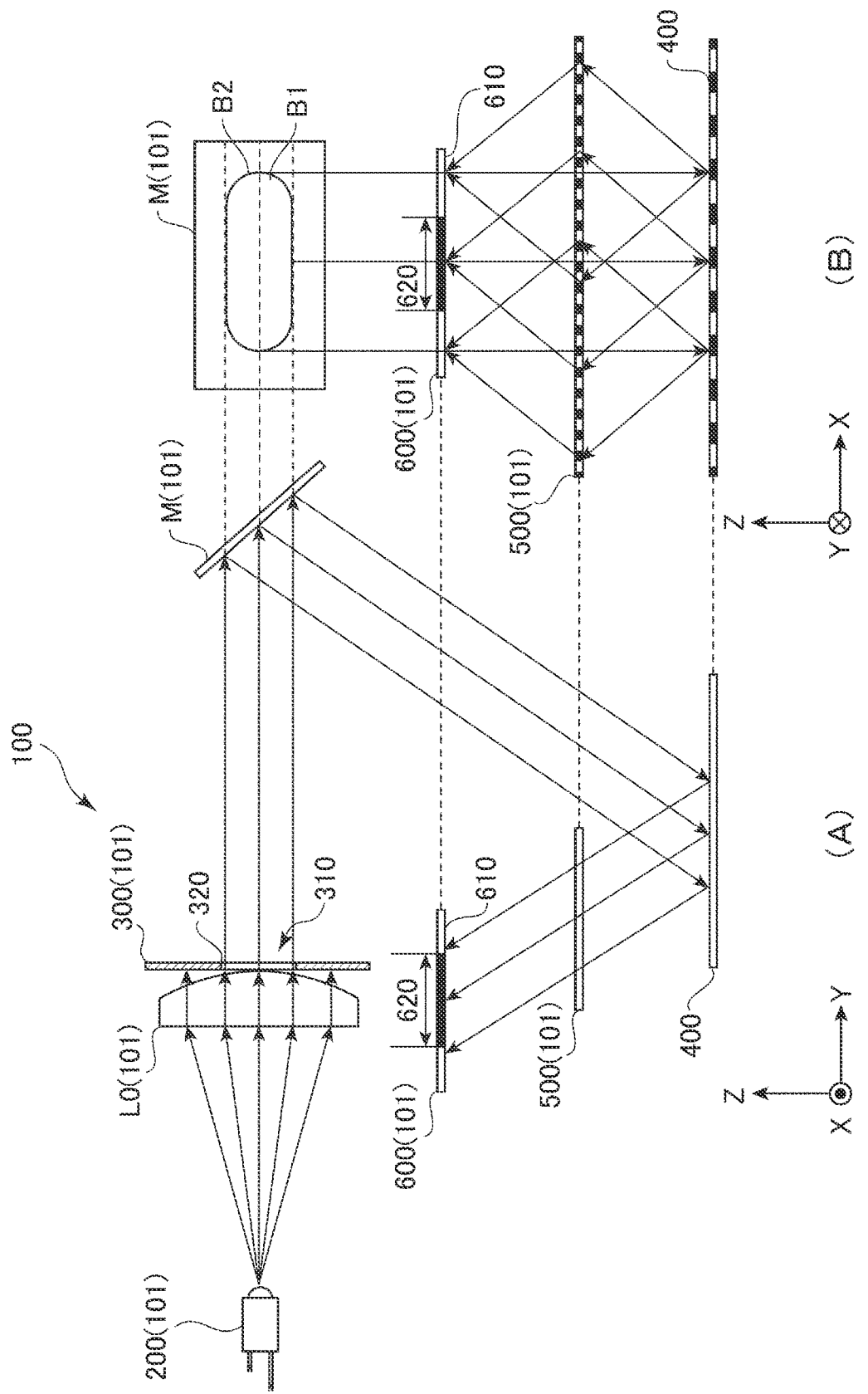
FIG. 8 is a schematic diagram showing an example of the configuration of a conventional optical encoder.
Figure 9:
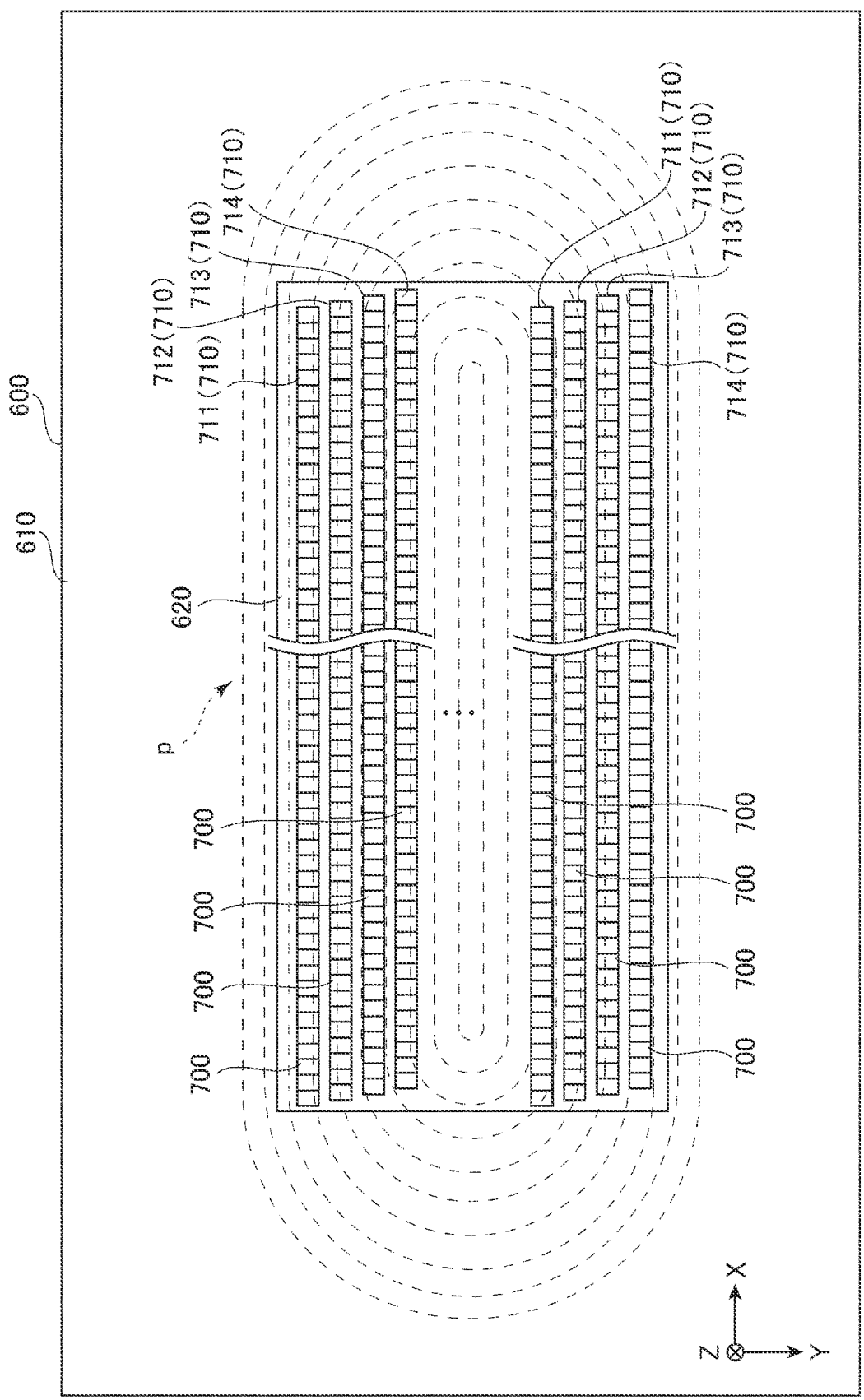
FIG. 9 is a diagram showing conventional light-receiving means.

FIG. 7 is a schematic diagram showing the optical encoder 1A according to the second embodiment. Specifically, section (A) in FIG. 7 is a schematic diagram showing the optical encoder 1A from the side, and section (B) in FIG. 7 is a schematic diagram showing the optical encoder 1A from a direction (i.e., a front direction) different from that in section (A). In FIG. 7, a portion of the light emitted from the light source 2 is illustrated by arrows to thereby indicate the directions and optical path of the light.

As shown in FIG. 7, in the optical encoder 1A, two lenses 5A are disposed between the scale 4 and the light-receiving means 6. The lens 5A collects the light that has passed through the scale 4, specifically the signal light, +/−1-order light rays, and images them on the light-receiving area 60 of the light-receiving means 6.

The lens 5A enables interference fringes to be generated in a more efficient manner, as compared to the case where no lens 5A is provided, since it collects the light that has been diffracted at the scale 4 such that such light generates interference fringes on the light-receiving area 60 of the light-receiving means 6.

In such second embodiment, the same advantageous effects as those of the above-described first embodiment can also be achieved. In addition, according to the second embodiment, the following advantageous effects can be achieved.

(8) The optical encoder 1A can image and detect scale random patterns using a lens imaging system. In addition, it is possible to improve the degree of freedom of design, since the optical encoder 1A allows the optical path of light, or the like, to be freely designed owing to the disposition of the lens 5A.

Modification of Embodiments

It should be noted that the present invention is not limited to the above-described respective embodiments, and any variation, improvement, or the like, is included in the present invention to the extent that the object of the present invention can be achieved.

For example, in the above-described respective embodiments, a case has been described wherein the present invention is employed in the optical encoder 1, which is a linear encoder, but the encoder is not particularly limited as to the format of the detector, the detection method, and the like, as long as it is an optical encoder. In the above-described respective embodiments, the scale 4 of the optical encoder 1 is of a reflective type that reflects the light from the light source 2, but the scale may be of a transmissive type. If the scale is of a transmissive type, the optical encoder can be configured accordingly.

In the above-described respective embodiments, the scale grating 40 is provided with a reflective part 41 and a non-reflective part 42, and the reflective part 41 is a metal plate. However, the scale grating may have any configuration as long as it has a grid-like pattern formed therein. For example, if the scale is of a non-transmissive type, the reflective part and the non-reflective part may be constructed by forming a periodic concavo-convex shape on the metal plate, or a similar material. In addition, the scale grating 40 may be formed by applying a membrane, or the like, formed in a grid-like pattern that does not transmit light to the scale plate. If the scale is of a transmissive type, the scale grating 40 may comprise periodic holes in a grid-like pattern formed in the scale, or periodic transmissive members.

In the first embodiment, the optical encoder 1 is provided with an index grating 5, and in the second embodiment, the optical encoder 1A is provided with a lens 5A. The number of these optical elements used may be higher than the number illustrated in the above-described respective embodiments, or these optical elements may not even be used.

In the above-described respective embodiments, the light-receiving means 6 outputs four-phase signals. However, the light-receiving means may output signals different from the four-phase signals (e.g., three-phase signals, two-phase signals, etc.), as long as it can receive light emitted from the light source and detect signals, and any configuration may be employed for the light-receiving means in order to accommodate the signals to be output.

In the above-described respective embodiments, the shielding plate 3, which is a beam-shaping element, is provided as a unitary member. However, the beam-shaping element may be constructed by a plurality of members that are physically separated. For example, the contour of the beam may be divided and limited by means of a plurality of members disposed along the optical path. In such case, the plurality of members that define the beam contour can be collectively regarded as a beam-shaping element (shielding plate 3).

The beam-shaping element may also be an optical element, such as a mirror, a beam splitter, or a lens, instead of a shielding plate 3. For example, by appropriately designing the shape of the reflective area of the mirror M in FIGS. 1 and 7, this may be used as a beam-shaping element for shaping the beam shape. Specifically, the reflective area in the mirror M is determined by an area where a reflective member, such as a metal, is deposited on the mirror M. If the shape of such area is designed so that there is no correlation with the long-length side section of the light-receiving area, effects equivalent to those of the above-described respective embodiments can be obtained. In this case, the mirror M corresponds to the "beam-shaping element", and the reflective area on the mirror M corresponds to the "beam-shaping part".

In the above-described respective embodiments, the short-length edge section 322 at the edge 32 of the opening 31, which is the beam-shaping part that defines the short-length contour portion B22 of the beam shape B1, is a circular arc with a radius R. However, the short-length edge section 322 may not need to be a circular arc. For example, short-length edge section 322 may have a linear shape, a wave shape, or an irregular shape.

In the above-described respective embodiments, the long-length edge section 321 at the edge 32 of the opening 31, which is the beam-shaping part that defines the long-length contour portion B21 of the beam shape B1, includes multiple circular arcs with a common radius R. However, the long-length edge section 321 may not need to include multiple circular arcs with a common radius R. For example, such long-length edge section 321 may have a linear shape, a wave shape, or an irregular shape.

INDUSTRIAL APPLICABILITY

As described above, the present invention can suitably be applied to optical encoders for measuring relative displacement between heads and scales.

What is claimed is:

1. An optical encoder, comprising: a scale having a scale grating arranged with a predetermined period along a measurement direction; a light source that emits light toward the scale; and light-receiving means that has a light-receiving area, the light-receiving area having multiple light-receiving elements arranged with a predetermined period in the measurement direction, and receiving light that has passed through the scale, wherein:
   the optical encoder comprises a beam-shaping element that shapes the beam shape, which is the shape of the light emitted from the light source, wherein
   the beam-shaping element is a single opening disposed between the light source and the scale, and
   the beam-shaping element defines the beam shape such that a shape of a long-length contour portion and a shape of a long-length side section have no correlation with each other, wherein
   the long-length contour portion is a portion of the beam shape extending in the measurement direction at a contour of the beam shape of the light from the light source to be emitted to the light-receiving means via the scale, and the long-length side section is a section of the light-receiving area extending in the measurement direction at a contour of the light-receiving area,
   the beam-shaping element includes a beam-shaping part with edges having predetermined shapes; and
   the predetermined shape of an edge of the beam-shaping part defining the long-length contour portion includes multiple circular arcs with a common radius.

2. The optical encoder according to claim 1, wherein the shape of the long-length side section is linear.

3. The optical encoder according to claim 1 wherein the shape of the edge of the beam-shaping part is a circular arc with the radius, the edge defining a short-length contour portion,
 wherein the short-length contour portion is a portion of the beam shape extending in a direction orthogonal to the measurement direction at the contour of the beam shape.

4. The optical encoder according to claim 1, wherein an index grating is provided between the scale and the light-receiving means, wherein the index grating has a grating arranged with a predetermined period.

5. The optical encoder according to claim 1, wherein a lens is provided between the scale and the light-receiving means, wherein the lens collects light that has passed through the scale and images the light on the light-receiving means.

6. The optical encoder according to claim 1, wherein the light emitted from the light source is laser light.

\* \* \* \* \*